Patented Nov. 6, 1951

2,574,078

UNITED STATES PATENT OFFICE 2,574,078

HYDROGENATED POLYALKYLATED PHENOLS

Arthur C. Whitaker, Oakmont, and William W. Weinrich, Wallingford, Pa., assignors to Gulf Research & Development Company, Pittsburgh, Pa., a corporation of Delaware No Drawing. Original application May 28, 1945, Serial No. 596,417, now Patent No. 2,505,817, dated May 2, 1950. Divided and this application February 24, 1949, Serial No. 78,225

3 Claims. (Cl. 260—586)

This invention relates to the production of hydrogenated polyalkylated phenols, and more particularly it concerns the enol and keto forms of 2,6-di-tertiary-butyl-4-methyl phenol plus 4 atoms of combined hydrogen and a process for producing the same.

This application is a division of our prior copending application Serial No. 596,417, filed May 28, 1945, now U. S. Patent 2,505,817, issued May 2, 1950.

Our parent application for patent discloses the production of the enol and keto forms of both 2,6-di-tertiary-butyl-4-methyl phenol plus 4 atoms of combined hydrogen and 2,6-di-tertiary-butyl-4-methyl phenol plus 2 atoms of combined hydrogen, and processes for producing these compounds. The primary object of the present invention is to provide, as new compounds, the enol and keto forms of 2,6-di-tertiary-butyl-4-methyl phenol plus 4 atoms of combined hydrogen, which are adapted to be utilized as chemical intermediates in the manufacture of plasticizers, pharmaceuticals, detergents, and antioxidants. A further object of the present invention is to provide a method of hydrogenating 2,6-di-tertiary-butyl-4-methyl phenol to convert said phenol into the enol and keto forms of 2,6-di-tertiary-butyl-4-methyl phenol plus 4 atoms of combined hydrogen.

In our above-identified copending application there is described a method whereby 2,6-di-tertiary-butyl-4-methyl phenol may be catalytically hydrogenated to convert it into 2,6-di-tertiary-butyl-4-methyl phenol plus 4 atoms of combined hydrogen or into 2,6-di-tertiary-butyl-4-methyl phenol plus 2 atoms of combined hydrogen. If the phenol is subjected to a slightly lower initial pressure and a slightly lower hydrogen pressure during hydrogenation for a slightly shorter length of time than would be required for the production of the product which is claimed herein, the phenol is combined with only 2 atoms of hydrogen, as claimed in our copending application. The objects of the present invention are attained by hydrogenating the phenol at a slightly higher initial pressure and a slightly higher hydrogenation pressure during hydrogenation for a slightly longer period of time than would be required for the production of the product having only 2 atoms of combined hydrogen. The product obtained is an equilibrium mixture of enol and keto forms.

In general, in practicing our invention for the production of 2,6-di-tertiary-butyl-4-methyl phenol plus 4 atoms of combined hydrogen, we introduce the phenol in suitable amount, and about 8 to 11 per cent, by weight, of a suitable hydrogenation catalyst, such as Raney or other form of nickel, platinum, or palladium, into a suitable pressure-resistant vessel, such as a rocking bomb, which is then closed and charged with hydrogen to the desired pressure, for example, about 1300 pounds per square inch of hydrogen. Heat is then applied to the bomb, for example, electrically, and the bomb is brought up to an initial reaction temperature of about 180° C. and to an initial reaction pressure of, for example, about 2300 pounds per square inch. About two hours may be required to heat the bomb and its contents to the initial reaction temperatures and pressures specified.

The temperature of reaction ranges from 160° to 250° C. and the pressure ranges from 1600 to 2500 pounds per square inch.

The bomb is continuously heated and its contents agitated, after the initial reaction temperature and pressure have been obtained, for a period of about 3 hours for the production of 2,6-di-tertiary-butyl-4-methyl phenol plus 4 atoms of combined hydrogen.

At the completion of the reaction as indicated by a drop in pressure (calculated on the basis of temperature—it may actually be a rise in pressure) of the bomb corresponding to the absorption of 2 moles of hydrogen per mole of 2,6-di-tertiary-butyl-4-methyl phenol, the bomb is allowed to cool and its contents are removed and filtered to separate the catalyst from the hydrogenation products. The hydrogenation products may then be purified in any desired manner to separate them from the initial starting materials, such as by fractionation in the case of liquid products, while the solid products may be purified by rectification, sublimation, or recrystallization.

It will be understood that the degree of hydrogenation is not destructive, i. e., the hydrogenation is not carried on to the extent that the OH group is reduced to give a hydrocarbon nor are the rings opened nor any groups removed.

It will be further understood that the temperature necessary to carry on a relatively mild hydrogenation is dependent upon the pressure and the higher the operating pressure the lower the temperature required to effect hydrogenation. The initial pressure is not as important as the pressure on the material when heated or the pressure at the end of the reaction. There must be sufficient hydrogen present at the end of the reaction to insure completion of the degree of hydrogenation desired, the final excess of hydrogen being indicated by the pressure of hydrogen present at that stage.

The following specific example will serve to illustrate our invention:

Sixty parts of 2,6-di-tertiary-butyl-4-methyl phenol, 9 parts of Raney nickel catalyst, and 1620 pounds per square inch of hydrogen were charged to a rocking bomb. The bomb was electrically heated for a period of about two hours until a reaction temperature of about 180° C. and a pressure of about 2350 pounds per square inch of hydrogen were obtained. The reaction was completed after the heating had been continued for a further period of about two and one-half hours and when a final reaction temperature of about 240° C. and a final pressure of about 2470 pounds per square inch had been attained. The product, after rectification, had the following properties:

|  | B. P. | Per Cent C | Per Cent H | Sp. Gr. 60°/60° F. | Refractive Index $n_D^{30°C}$ |
|---|---|---|---|---|---|
| Calculated | | 80.36 | 12.50 | | |
| Found | 132–4° C./20 mm | 80.39 | 12.50 | 0.8883 | 1.4598 |

The following equation illustrates the products produced in the above example, the structural formula given on the left representing the enol form of the compound while the formula on the right represents the keto form of the compound, both forms occurring in admixture:

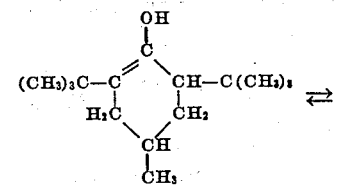

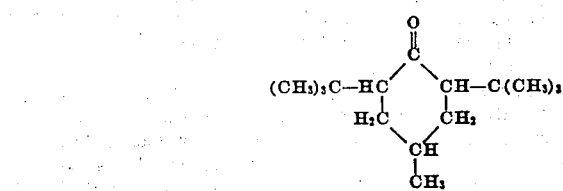

2,6-di-tertiary-butyl-4-methyl-1-cyclohexenol ⇌ 2-6-di-tertiary-butyl-4-methyl cyclohexanone The compounds of the present invention are adapted to be employed as chemical intermediates in the manufacture of pharmaceuticals, plasticizers, detergents, and as antioxidants for mineral oils and gasoline.

Resort may be had to such modifications and variations as fall within the spirit of the invention and the scope of the appended claims.

What we claim is:

1. An equilibrium mixture of enol and keto forms of compounds having the following structural formulas:

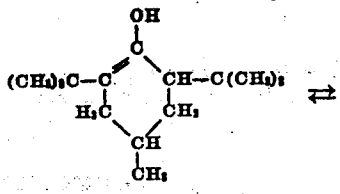

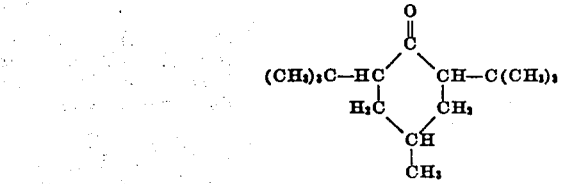

2. As a new product, a compound having the following structural formula:

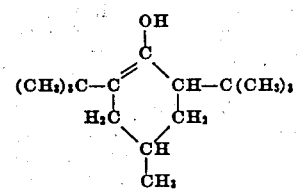

3. As a new product, a compound having the following structural formula:

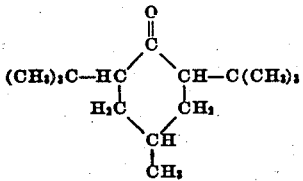

ARTHUR C. WHITAKER.
WILLIAM W. WEINRICH.

REFERENCES CITED

The following references are of record in the file of this patent:

UNITED STATES PATENTS

| Number | Name | Date |
|---|---|---|
| 2,087,691 | Lazier | July 20, 1937 |
| 2,265,582 | Stevens et al. | Dec. 9, 1941 |
| 2,328,719 | Houghton | Sept. 7, 1943 |
| 2,443,015 | Whitaker et al. | June 8, 1948 |
| 2,505,816 | Whitaker et al. | May 2, 1950 |

OTHER REFERENCES

Ellis: "Hydrogenation of Organic Substances," pages 231 to 233, copyright 1930 by D. Van Nostrand Co., New York.

Darzens et al. Compt. rend., vol. 152, pages 607–609 (1911).